US010106379B2

(12) United States Patent
Reesing et al.

(10) Patent No.: US 10,106,379 B2
(45) Date of Patent: Oct. 23, 2018

(54) CRANE SUPERSTRUCTURE DRIVE DEVICE

(71) Applicant: Manitowoc Crane Group France SAS, Dardilly (FR)

(72) Inventors: Jann Reesing, Butjadingen (DE); Johannes Schuermann, Jever (DE)

(73) Assignee: MANITOWOC CRANE GROUP FRANCE SAS, Dardilly (FR)

( * ) Notice: Subject to any disclaimer, the term of this patent is extended or adjusted under 35 U.S.C. 154(b) by 0 days.

(21) Appl. No.: 15/485,978

(22) Filed: Apr. 12, 2017

(65) Prior Publication Data

US 2017/0349413 A1 Dec. 7, 2017

(30) Foreign Application Priority Data

Jun. 1, 2016 (DE) ........................ 10 2016 110 108

(51) Int. Cl.

*F16D 31/02* (2006.01)
*B66C 23/00* (2006.01)
*F15B 11/08* (2006.01)
*F15B 11/17* (2006.01)

(52) U.S. Cl.

CPC .............. *B66C 23/54* (2013.01); *F15B 11/08* (2013.01); *F15B 11/17* (2013.01); *F15B 2211/20576* (2013.01)

(58) Field of Classification Search

CPC .......... F15B 11/16; F15B 11/17; B66C 23/38; B66C 23/40; B66C 23/54

See application file for complete search history.

(56) References Cited

U.S. PATENT DOCUMENTS 4,069,884 A 1/1978 Morrow, Sr. et al.
8,567,539 B2 * 10/2013 Morath .................. B66C 23/38 180/53.1

FOREIGN PATENT DOCUMENTS

| | | | |
|---|---|---|---|
| CN | 1339659 | A | 3/2002 |
| CN | 202088884 | U | 12/2011 |
| DE | 102013021499 | A1 | 6/2015 |
| EP | 1752411 | A1 | 2/2007 |
| EP | 2551234 | A1 | 1/2013 |
| JP | H09278371 | A | 10/1997 |
| NL | 7513196 | A | 5/1976 |

OTHER PUBLICATIONS

Extended European Search Report issued by ISA/EPO in connection with EP17160742 dated Sep. 8, 2017.
Office Action dated Jul. 14, 2018 in corresponding Chinese Application No. 201710233445.8 and English translation of the same.

* cited by examiner

*Primary Examiner* — Michael Leslie
(74) *Attorney, Agent, or Firm* — Levenfeld Pearlstein, LLC

(57) ABSTRACT

The invention relates to a drive device for supplying power to multiple engine pumps (4, 5), provided in the superstructure (3) of a mobile crane for superstructure functions, by way of a drive motor (2) arranged in the undercarriage (1) of the mobile crane, comprising a hydraulic motor (7) which is arranged in the superstructure (3) and hydraulically driven by the drive motor (2) and which comprises a first mechanical output which couples at least one first engine pump (4) to the hydraulic motor (7) and a second mechanical output which couples at least one second engine pump (5) to the hydraulic motor (7). The invention also relates to a mobile crane comprising this drive device.

15 Claims, 3 Drawing Sheets

CRANE SUPERSTRUCTURE DRIVE DEVICE

CROSS-REFERENCE TO RELATED APPLICATION

This application claims priority under 35 U.S.C. § 119(a) to German Patent Application No. 10 2016 110 108.7, filed on Jun. 1, 2016, the disclosure of which is incorporated fully by reference herein.

FIELD

The present invention relates to a drive device for supplying power to the superstructure of a mobile crane. The present invention also relates to a mobile crane comprising this drive device.

BACKGROUND

A mobile crane usually comprises not only a combustion engine in the undercarriage, which is provided for the traction drive, but also another combustion engine in the superstructure which is provided exclusively for supplying power to the consumers in the superstructure, such as for example the lifting mechanism, the derricking mechanism or the telescoping mechanism.

In smaller mobile cranes, and in recent years increasingly in larger mobile cranes as well, there has been a switch, in favour of lower inherent weight and the associated advantages, towards using the undercarriage motor—originally used mainly for the traction drive—for supplying power to the crane superstructure as well. One known design solution envisages a hydraulic pump in the crane undercarriage for this purpose, which is driven by the undercarriage motor and in turn drives a hydraulic motor via a hydraulic circuit which extends from the undercarriage into the superstructure. The individual pumps for the respective crane functions are coupled to and driven by said hydraulic motor. Said pumps are dimensioned in accordance with their respective power requirements and therefore reach their optimum operating point at different rotary speeds. Consequently, a so-called pump transfer gearbox has to be connected downstream of the motor, via which the individual pumps are coupled to the hydraulic motor at a rotary speed which is optimised for them. However, this pump transfer gearbox itself incurs an increased weight and cost outlay.

SUMMARY

It is the object of the present invention to provide a hydraulic drive for a crane superstructure, which is optimised in particular with regard to weight and cost, and a corresponding mobile crane.

In accordance with the invention, a drive device is provided by means of which multiple engine pumps, provided in the superstructure of a mobile crane for superstructure functions, are supplied with power by a drive motor which is arranged in the undercarriage of the mobile crane, wherein the drive device comprises a hydraulic motor which is arranged in the superstructure and hydraulically driven by the drive motor and which comprises a first mechanical output, which couples at least one first engine pump to the hydraulic motor, and a second mechanical output which couples at least one second engine pump to the hydraulic motor.

In other words, the invention envisages a hydraulic motor in the crane superstructure which is hydraulically driven by the motor arranged in the crane undercarriage, which is preferably a combustion engine, wherein the hydraulic motor comprises two outputs via which at least one engine pump is respectively coupled to the hydraulic motor and thus supplied with power.

The advantages associated with the invention shall be illustrated by the following consideration: if a pump transfer gearbox and a power split provided by it are to be omitted in the crane superstructure, then the individual engine pumps provided for the respective superstructure functions have to be connected “in series”, i.e. each engine pump comprises not only the drive, by means of which it is driven by the hydraulic motor, but also an output for the engine pump(s) following it. Consequently, it is also necessary for the drive of each engine pump to accommodate not only the drive moment of the respective engine pump but also in addition the drive moment(s) of the subsequent engine pump(s). Ultimately, the engine pumps have to be dimensioned more powerfully for connecting them successively in this way, in order to be able to accommodate the additional exposure.

This is where the present invention comes in, by replacing the conventionally embodied hydraulic motor comprising just one output with a hydraulic motor which, contrary to previous approaches, comprises two outputs. This enables two “series connections” to be realised, which significantly reduces the occurring exposure due to the reduced number of engine pumps present in an individual series connection. Ultimately, a significant cost and weight advantage—as compared to an individual series connection—can thus be realised.

In accordance with a preferred embodiment of the present invention, the hydraulic motor arranged in the superstructure is driven from the undercarriage via a closed hydraulic circuit. It is however equally conceivable for the hydraulic motor to be driven from the undercarriage via an open circuit. It is also conceivable for multiple hydraulic pumps to be provided in the crane undercarriage for driving the hydraulic motor, wherein said hydraulic pumps are each connected to the hydraulic motor via a proprietary hydraulic circuit or are connected to the hydraulic motor via a common, open or closed hydraulic circuit.

Within the framework of the present invention, it is possible to provide a means for transmitting mechanical power, such as for example a shaft, at each of the outputs of the hydraulic motor, wherein the respective engine pumps are directly coupled to the hydraulic motor by said means. The engine pumps which are coupled to the hydraulic motor in this way thus rotate at the same rotary speed as the hydraulic motor. It is however equally conceivable for individual engine pumps or multiple engine pumps to be coupled to a pump, connected upstream of them, or to the hydraulic motor via a gearbox, which enables pumps on one drive train to be operated at different rotary speeds. It is in particular conceivable to provide a (smaller) pump transfer gearbox at at least one output of the hydraulic motor, which provides outputs running at different rotary speeds for different engine pumps. The outputs of the pump transfer gearbox are preferably arranged in parallel with each other and in particular also in parallel with the remaining output of the hydraulic motor.

Where more than two engine pumps are to be driven by means of the hydraulic motor, it is possible to provide a series connection of at least two pumps, as already described above, at at least one output of the hydraulic motor. Since the number of engine pumps connected in series in this way is substantially lower than when all of the available engine pumps are connected in series, the additional exposure for individual pumps within the series connection is also substantially lower. This “series connection” shall be referred to in the following as an engine pump group.

As has likewise already been described above, the engine pump within such an engine pump group which is respectively arranged nearer the output of the hydraulic motor can comprise a drive shaft for driving the engine pump following it. Such a drive shaft on one or more engine pumps can thus be regarded as a common shaft of an engine pump group or can even comprise a common continuous shaft or a shaft which is sub-divided into individual partial segments. Where an engine pump group does not comprise a transmission gear, all the pumps within a group are operated at the same rotary speed and are therefore to be designed accordingly.

It is then in particular advantageous if the engine pump within an engine pump group which is respectively arranged nearer the output of the hydraulic motor exhibits a higher power uptake than the engine pump following it. This reduces the occurring additional exposure for the pumps lying nearer the hydraulic motor.

The engine pumps within a group can then supply the respective units performing superstructure functions with power either via an open hydraulic circuit or via a closed hydraulic circuit.

It is particularly advantageous if the drive shaft(s) of the engine pump(s) is/are arranged in parallel, in particular substantially coaxially. Where the first and second output of the hydraulic motor are additionally arranged in parallel, in particular also substantially coaxially, on opposite sides of the hydraulic motor, this enables a particularly compact drive device for supplying power to the crane superstructure to be realised. It is easily conceivable for all the engine pumps, including the hydraulic motor, to be arranged in this way in a row and for the entire arrangement to extend substantially in only one dimension.

The drive device in accordance with the invention can additionally be provided with a device which detects the rotary speed of an output and which is in particular arranged between the hydraulic motor and an engine pump which lies nearest the hydraulic motor.

Another aspect of the present invention relates to a mobile crane which comprises: an undercarriage featuring a drive motor, preferably a combustion engine; a superstructure featuring multiple engine pumps provided for the superstructure functions; and a drive device in accordance with an embodiment such as has been described above.

BRIEF DESCRIPTION OF THE DRAWINGS

In the following, preferred embodiments of the present invention are described in more detail by referring to the enclosed figures. The invention can comprise the features described here, individually and in any expedient combination. Specifically, there is shown.

DESCRIPTION

Figure 1:
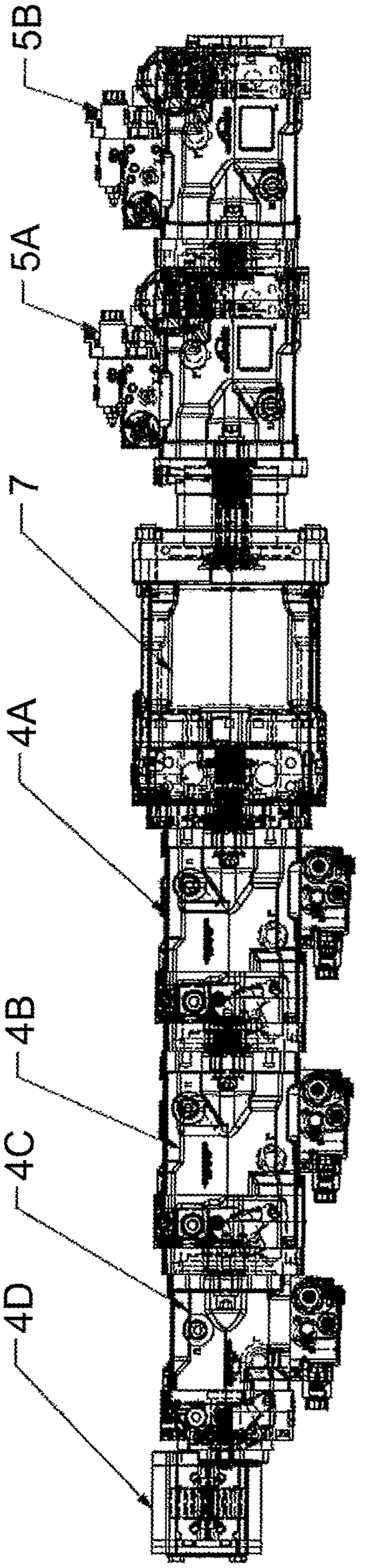
FIG. 1 a first linear arrangement of engine pumps.

FIG. 1 shows a first linear arrangement of multiple engine pumps 4A to 4D, 5A and 5B which are coupled, substantially coaxially, to two outputs on each of the two sides of the hydraulic motor 7, wherein the pumps 5A and 5B form an engine pump group and the pump 5B is not driven directly by the hydraulic motor 7 but rather indirectly via the pump 5A which provides an output for the pump 5B and is in turn driven directly by the hydraulic motor 7. A very similar arrangement is to be found at the other, coaxially opposite output of the hydraulic motor 7 shown on the left-hand side in FIG. 1, in which the pump 4A is directly coupled to the hydraulic motor 7, and the pumps 4B to 4D are driven via outputs of the pumps connected respectively upstream of them.

Figure 2:
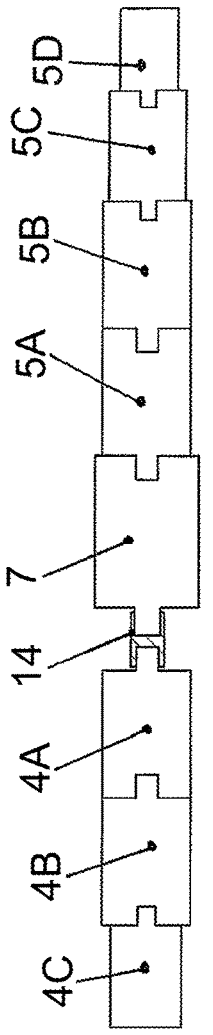
FIG. 2 a second linear arrangement of engine pumps.

A very similar arrangement to the arrangement from FIG. 1 is shown schematically in FIG. 2. A hydraulic motor 7, which is again provided centrally, drives groups of coaxially arranged pumps 4A to 4C and 5A to 5D on each of its two sides, wherein the individual pumps perform various functions for supplying power to the crane superstructure. In one specific case, the pump 4A is for example an open-circuit pump for the telescoping and derricking mechanism, the pump 4B is an open-circuit pump for the telescoping and derricking mechanism, the pump 4C is an open-circuit pump for the auxiliary engines, the pump 5A is a closed-circuit pump for the main lifting mechanism, the pump 5B is a closed-circuit pump for the auxiliary lifting mechanism, the pump 5C is a closed-circuit pump for the slewing mechanism, and the pump 5D is a toothed wheel pump for the control pressure. A device 14 for detecting the rotary speed is additionally arranged between the hydraulic motor 7 and the pump 4A.

Figure 3:
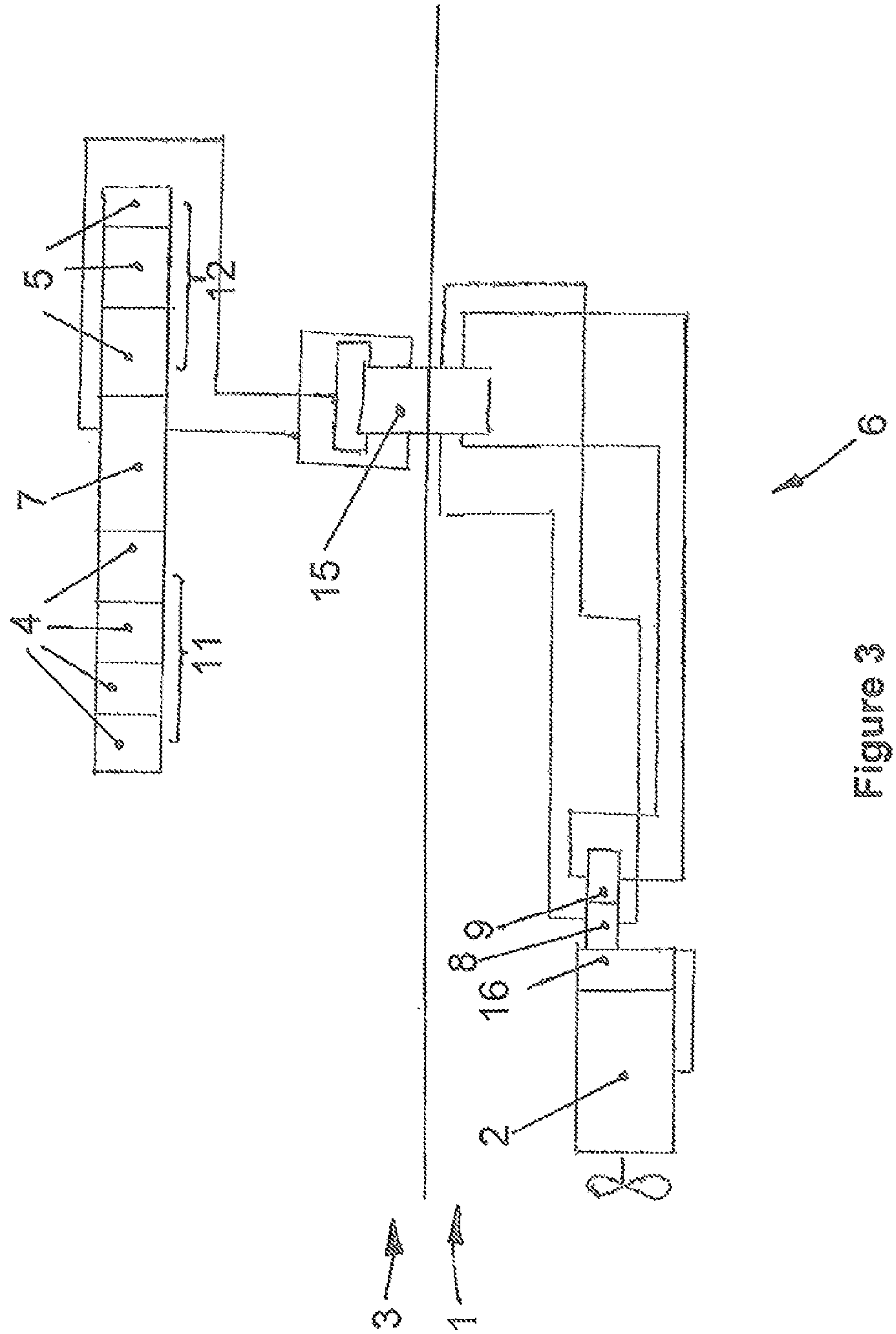
FIG. 3 a first embodiment of the drive device in accordance with the invention.

FIG. 3 shows a first embodiment of the drive device in accordance with the invention. A combustion engine 2, which is arranged in the undercarriage 1 of the crane, drives two hydraulic pumps 8 and 9 via a gearbox 16, wherein the hydraulic pumps 8 and 9 drive the hydraulic motor 7 via a closed hydraulic circuit 6 of the drive device which extends from the undercarriage 1 into the superstructure 3 via the rotary union 15. Engine pump groups 11 and 12, each comprising multiple engine pumps 4 and 5, respectively, are again arranged on each of the two sides of the hydraulic motor 7.

Figure 4:
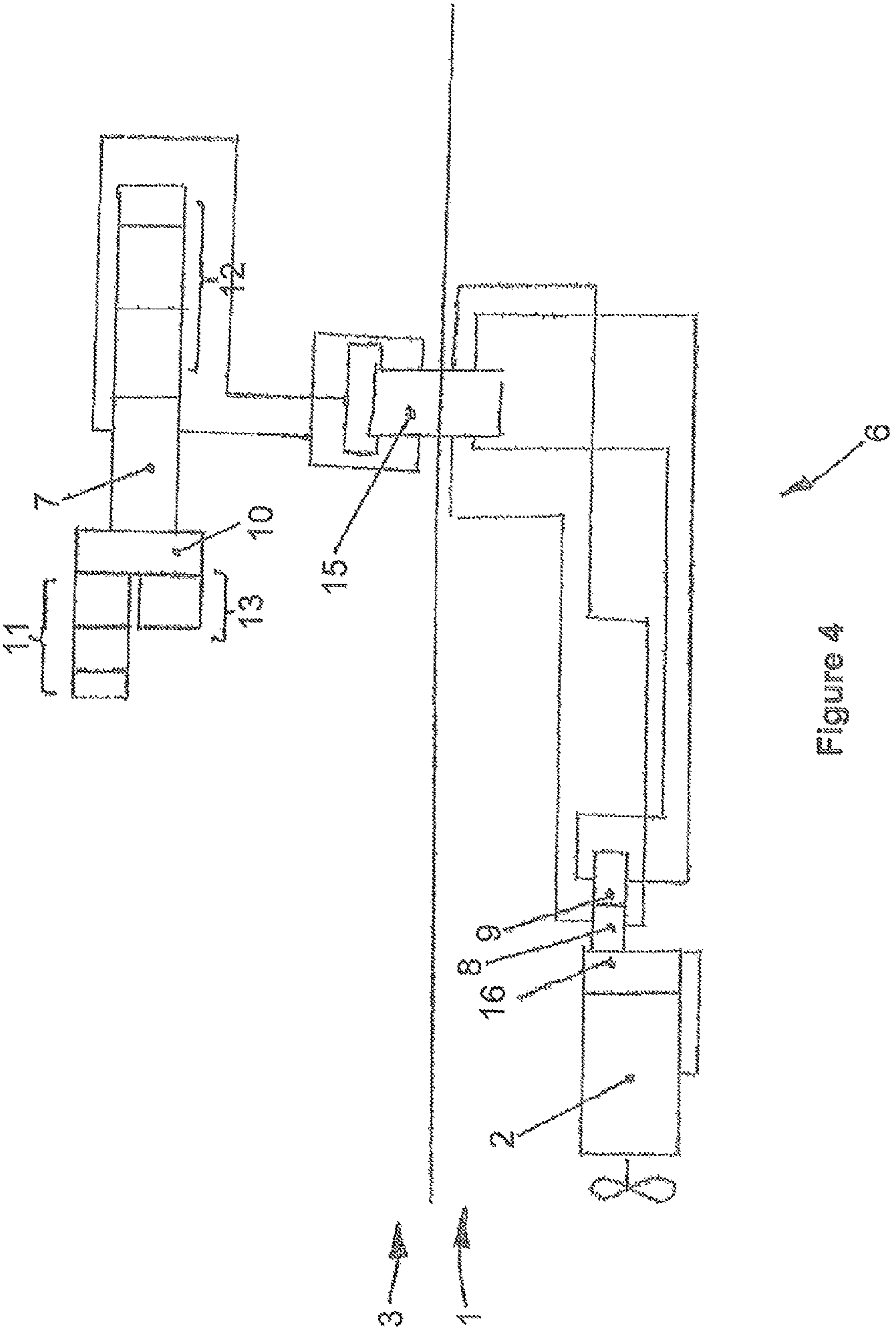
FIG. 4 a second embodiment of the drive device in accordance with the invention.

FIG. 4 shows another embodiment of the drive device in accordance with the invention, which differs from the embodiment shown in FIG. 3 solely by a pump transfer gearbox 10 which is directly coupled to the hydraulic motor 7 (on its left-hand side in FIG. 4) and in turn comprises two outputs for two engine pump groups 11 and 13 running at different rotary speeds.

The invention claimed is:

1. A drive device for supplying power to multiple engine pumps, provided in a superstructure of a mobile crane for superstructure functions, by way of a drive motor arranged in the undercarriage of the mobile crane, the drive device comprising:

a hydraulic motor which is arranged in the superstructure and hydraulically driven by the drive motor and which comprises a first mechanical output which couples at least one first engine pump to the hydraulic motor and a second mechanical output which couples at least one second engine pump to the hydraulic motor.

2. The drive device according to claim 1, hydraulic motor is driven via an open or closed hydraulic circuit.

3. The drive device according to claim 1, wherein one or more hydraulic pumps are provided for driving the hydraulic motor.

4. The drive device according to claim 1, wherein an engine pump is coupled directly to the hydraulic motor via a transmission member at the first output and/or at the second output.

5. The drive device according to claim 1, wherein a transfer gearbox is coupled directly to the hydraulic motor via a transmission member at the first output and/or at the second output, and in turn comprises at least two outputs.

6. The drive device according to claim 5, wherein the at least two outputs of the transfer gearbox are arranged coaxially with each other.

7. The drive device according to claim 1, comprising at least one engine pump group which is coupled to the hydraulic motor via a common output of the hydraulic motor or transfer gearbox and comprises at least two engine pumps.

8. The drive device according to claim 7, wherein the engine pump within a group which is respectively arranged nearer the output provides a drive shaft for driving the engine pump following it.

9. The drive device according to claim 7, wherein the engine pumps within a group are coupled to each other such that said engine pumps coupled to the hydraulic motor are operated at the same rotary speed.

10. The drive device according to claim 7, wherein the engine pump within a group which is respectively arranged nearer the output exhibits a higher power uptake than the engine pump following it.

11. The drive device according to claim 7, wherein all of the engine pumps within a group supply the respective units performing superstructure functions with power either via an open hydraulic circuit or via a closed hydraulic circuit.

12. The drive device according to claim 8, wherein the at least one engine pump group comprises two engine pump groups, wherein the drive shafts of the engine pumps within a group which are respectively arranged nearest the output are arranged coaxially.

13. The drive device according to claim 1, wherein the first and second output are arranged coaxially on opposite sides of the hydraulic motor.

14. The drive device according to claim 1, further comprising a device which detects the rotary speed of an output.

15. A mobile crane which comprises: an undercarriage featuring a drive motor; a superstructure featuring multiple engine pumps provided for the superstructure functions; and a drive device in accordance with claim 1.

* * * * *